US006771763B1

(12) United States Patent
Hagirahim et al.

(10) Patent No.: US 6,771,763 B1
(45) Date of Patent: Aug. 3, 2004

(54) METHOD AND APPARATUS FOR PROVIDING EFFICIENT VODSL GATEWAY-TO-GATEWAY COMMUNICATION

(75) Inventors: Hassan Hagirahim, Long Branch, NJ (US); Francis Waldman, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/551,121

(22) Filed: Apr. 18, 2000

(51) Int. Cl.[7] .......................... H04M 7/00; H04M 3/22; H04L 12/66
(52) U.S. Cl. ...................... 379/219; 379/27.01; 370/24; 370/352; 370/356
(58) Field of Search .................... 370/352, 24, 356; 379/27.01, 219

(56) References Cited

U.S. PATENT DOCUMENTS

| 5,463,616 | A  | * | 10/1995 | Kruse et al. .................. 370/24 |
| 6,272,209 | B1 | * | 8/2001  | Bridger et al. ........... 379/27.01 |
| 6,542,499 | B1 | * | 4/2003  | Murphy et al. ............. 370/352 |
| 6,560,225 | B1 | * | 5/2003  | Czajkowski et al. ........ 370/356 |

* cited by examiner

Primary Examiner—Ahmad F. Matar
Assistant Examiner—Thjuan P Knowlin

(57) ABSTRACT

The invention comprises a system and method for transmitting and receiving VoDSL voice traffic that avoids, where possible, the transcoding of a speech signal multiple times. The invention advantageously provides enhanced Quality of Service (QoS) by opportunistically avoiding signal degradation where VoDSL to VoDSL gateway communications may be provided.

20 Claims, 6 Drawing Sheets

US 6,771,763 B1

METHOD AND APPARATUS FOR PROVIDING EFFICIENT VODSL GATEWAY-TO-GATEWAY COMMUNICATION

BACKGROUND OF THE DISCLOSURE

1. Technical Field of the Invention

This invention generally relates to the field of communication systems and, more particularly, to a Voice over Digital Subscriber Line (VoDSL) gateway to gateway communication system for use in the Public Switch Telephone Network (PSTN).

2. Description of the Background Art

Digital Subscriber Line (DSL) is a technology that enables simultaneous voice and data communication via a single transmission medium, such as a conditioned copper pair. DSL also provides a relatively high data rate for such data communications. Traditionally, if a subscriber wanted to receive and transmit voice and data simultaneously, or to have more than one voice line, the subscriber required more than one telephone line such additional telephone lines depended upon the availability of extra copper pairs being available from the local service provider's Central Office (CO) to the subscriber's business or home. With the advent of DSL, an additional telephone line is no longer required since DSL technology allows the simultaneous operation of a plurality of telephones and/or at least one data device over a single copper pair.

In providing VoDSL service, the convention is to digitize and compress, at the subscriber's premise, one or more voice inputs from respective telephones using a conventional voice compression algorithm. The compressed voice traffic is then multiplexed with any data traffic. The multiplexed voice and data traffic is then packetized into an Asynchronous Transfer Mode (ATM), Internet Protocol (IP) or frame relay format to be transmitted over a copper loop (or other medium) using DSL. At the CO, a Digital Subscriber Line Access Multiplexer (DSLAM), operates as a packet concentrator to multiplex a number of packetized voice/data signals and send the multiplexed signals to a VoDSL gateway, where the voice traffic is decompressed and converted to standard 64kb/s signals using Pulse Code Modulation (PCM). The VoDSL gateway interfaces with the Public Switch Telephone Network (PSTN) using typically the Bell Communications Research's Generic Requirements GR-303 or Technical Requirements TR008 protocol, and the PCM signal will be sent through the PSTN using Time Division Multiplexing (TDM) via Digital Signal level Zero (DS0) channels on a trunk, also known as a T1.

After being routed through the PSTN, the voice traffic is provided to a second VoDSL gateway that operates to compress, multiplex and packetize the received 64kb/s DS0 signal. The resulting signal is then transmitted to the subscriber's premises where the voice traffic will be decompressed, demultiplexed, depacketized and undigitized again.

SUMMARY OF THE INVENTION

The invention comprises a system and method for transmitting and receiving VoDSL voice traffic that avoids, where possible, the transcoding of a speech signal multiple times. The invention advantageously provides enhanced Quality of Service (QoS) by opportunistically avoiding signal degradation.

A method for routing voice traffic using a Public Switch Telephone Network (PSTN) according to the invention comprises the steps of: receiving, at a VoDSL gateway servicing a first subscriber, compressed voice traffic from the first subscriber for routing to a second subscriber; determining whether the second subscriber is served by a respective second VoDSL gateway; processing the received voice traffic in a manner dependent on whether the second subscriber is served by the respective second VoDSL gateway; and communicating with the second subscriber.

A gateway to gateway communication system according to the invention comprises: a Voice over Digital Subscriber Line (VoDSL) gateway, for communicating voice traffic between a first subscriber and a second subscriber via a Public Switch Telephone Network (PSTN); the VoDSL gateway, in response to a second VoDSL gateway communicating a signaling message via the PSTN, transmits the voice traffic in a transport packet to the second VoDSL gateway; and the VoDSL gateway, in response to a failure to detect the second VoDSL gateway, encoding and transmitting the voice traffic to the second subscriber.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION OF THE INVENTION

The invention will be described within the context of a pair of subscribers (A and B) communicating via respective Digital Subscriber Line (DSL) services. It should be noted that the present invention does not require a specific DSL service type, such as Asymmetric Digital Subscriber Line (ADSL), Rate Adaptive DSL (RADSL), Single-line DSL (SDSL), Integrated Services Digital Network (IDSL) and the like. Therefore, those skilled in the art and informed by the teachings of the present invention will be able to readily adopt any appropriate DSL service type for use with the present invention. Moreover, the teachings of the invention are applicable to systems including a mix of DSL subscribers and non-DSL subscribers.

Figure 1:
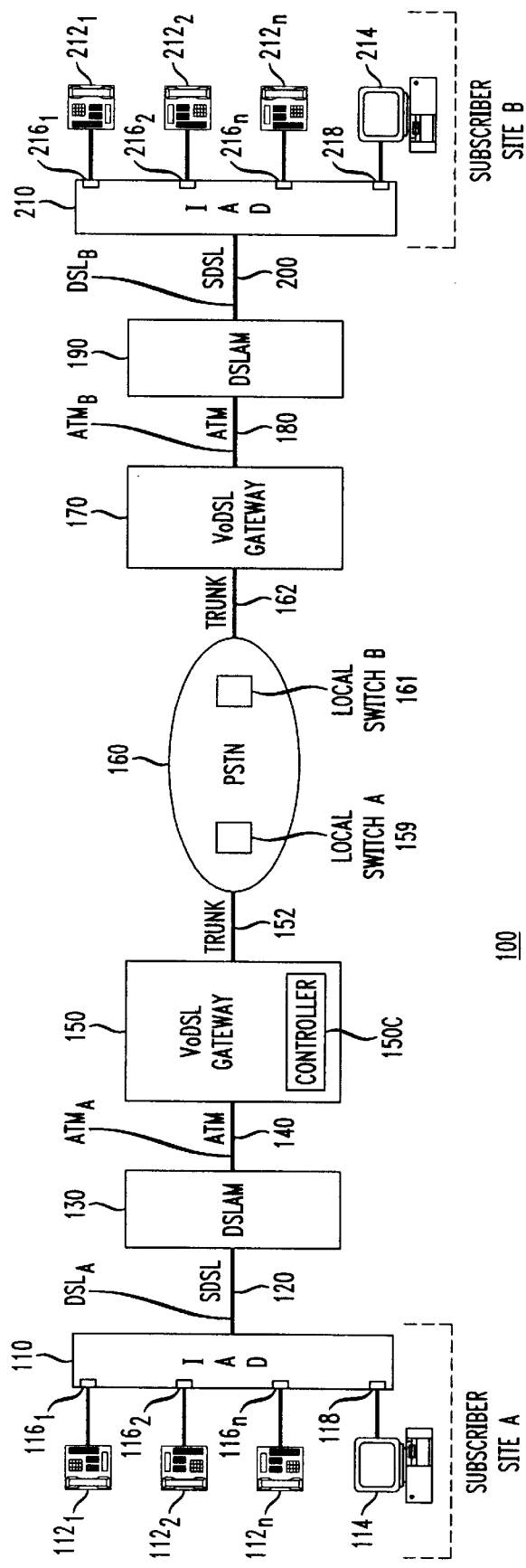
FIG. 1 depicts a high level block diagram of a communications system including the present invention.

FIG. 1 depicts a high level block diagram of a communications system including the present invention. Specifically, the system of FIG. 1 comprises a first Integrated Access Device (IAD) 110 having a plurality of telephone ports $116_1$, $116_2$, up to $116_N$ (collectively telephone ports 116) and at least one data port 118. Each of the telephone ports 116 comprises, for example, an RJ11 jack and associated conductors that is operatively coupled to a respective one of a first plurality of telephones $112_{1,}$ $112_2$, up to $112_n$ (collectively telephones 112) for carrying voice traffic. The IAD 110 also comprises at least one data port 118, for example a RJ45 jack and associated conductors for carrying data traffic (e.g., Ethernet data), operatively coupled to at least one computing device 114 at subscriber site A.

A first DSL service ($DSL_A$) utilizing a copper pair 120 physical layer is connected to the first IAD 110. The first DSL service ($DSL_A$), and any other DSL services (not shown), are connected to a first Digital Subscriber Line Access Multiplexer (DSLAM) 130. That is, the first DSLAM 130 may be operatively coupled to other respective pluralities of IADs or Residential Gateways (RGs). However, to simplify the discussion of the present invention, the first DSLAM 130 is shown as being coupled to only a single respective IAD 110 through a DSL service ($DSL_A$) utilizing a first copper pair 120.

A first VoDSL gateway 150 is connected to the first DSLAM 130 via Asynchronous Transfer Mode ($ATM_A$) service utilizing a first carrier 140, such as an Optical Carrier level 3 (OC3) or Digital Signal level 3(DS3) carrier. The first VoDSL gateway 150 gains access to a first switch 159 local to subscriber A within the Public Switch Telephone Network (PSTN) 160 via a first trunk 152. The first trunk 152 comprises, illustratively, a T1 having twenty-four Digital Signal level Zero (DS0) channels. The PSTN supports a communication between the first switch 159 coupled to a second switch 161, where the second switch 161 is local to a second subscriber B. A second trunk 162, supports communication between the first switch B 161 and a second VoDSL gateway 170. A second trunk 162 supports communication between second local switch 161 and a second VoDSL gateway 170. A second carrier 180 having ATM ($ATM_B$) service connects the second VoDSL gateway 170 to a second DSLAM 190. Connecting a second IAD 210 to the second DSLAM 190 is a DSL ($DSL_B$) service utilizing, for example, a second copper pair 200.

At subscriber site B, the second IAD 210 has a plurality of telephone ports $216_1$, $216_2$, up to $216_N$ (collectively telephone ports 216) and at least one data port 218. The telephone ports 216 are operatively coupled to a first plurality of telephones $212_1$, $212_2$, up to $212_n$ (collectively telephones 212), and the at least one data port 218 is operatively coupled to at least one computing device 214.

It should be noted that the operation of the first IAD 110, DSLAM 130, and VoDSL gateway 150 are similar to the operation of, respectively, the second IAD 210, second DSLAM 190 and second VoDSL gateway 170. Differences in operation will be described in more detail.

In the case of a voice communication from subscriber A to subscriber B, the first IAD 110 digitizes the voice signals from the telephones 112 and compresses those voice signals in a conventional manner using a voice compression algorithm. The compressed voice signal is in turn packetized and then multiplexed with any data signal from the at least one computing device 114 by the first IAD 110. The resulting multiplexed signal is formatted according to, for example, the ATM packet structure using the ATM Adaptation Layer 2 (AAL2) protocol. The AAL2 packet data structure as adapted to the present invention will be described in more detail below with respect to FIG. 2.

The AAL2 packets are transmitted to the first DSLAM 130 via the first DSL service ($DSL_A$). Specifically, in the embodiment of FIG. 1, the first DSL service ($DSL_A$) provides an ATM over DSL service. At the first DSLAM 130, received voice packets and data packets are separated. The data packets are routed, for example, to the Internet or other computing network (not shown) while the voice packets are routed to the first VoDSL gateway 150 in the AAL2 protocol format over first carrier 140 having ATM ($ATM_A$) service.

The first VoDSL gateway 150 is depicted in FIG. 1 as including an optional controller 150C, which will be described in more detail below with respect to FIG. 6. Briefly, the optional controller 150C comprises general purpose computing elements operative to implement the methods of the present invention. While not explicitly shown in FIG. 1, such an optional controller may also be included within the second VoDSL gateway 170.

Figure 2:
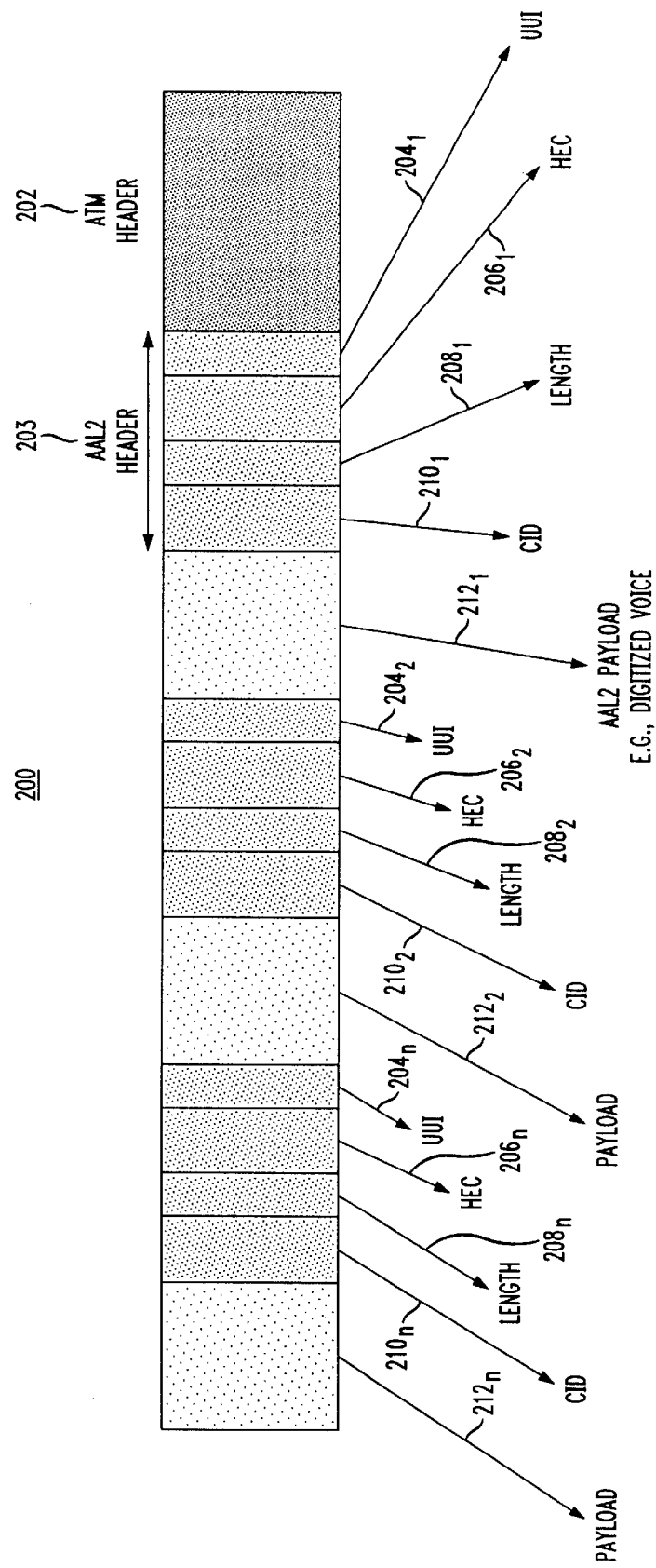
FIG. 2 depicts a diagram of an Asynchronous Transfer Mode Adaptation Layer 2 (AAL2) packet data structure useful in understanding the operation of the communications system in FIG. 1.

FIG. 2 depicts a diagram of an AAL2 packet data structure useful in understanding the operation of the communications system in FIG. 1. Specifically, FIG. 2 shows the packet data structure of the Common Part Sub-layer (CPS) of an AAL2 packet 200 that may be used in the communications system of FIG. 1 between the first IAD 110 and first VoDSL gateway 150 and between the second IAD 210 and second VoDSL gateway 170. Any differences between the standard AAL2 packet structure and the packet structure of FIG. 2 comprise data structure modification according to the present invention.

The CPS of an AAL2 packet 200 comprises an ATM Header 202 for routing the packets through an ATM network, an AAL2 header 203 and AAL2 payload fields $212_1$, $212_2$ up to $212_n$ (collectively AAL2 payload) including packets associated with a compressed voice communication. An AAL2 header 203 comprises a User-to-User Indicator (UUI) fields $204_1$, $204_2$, up to $204_n$ for providing a link between the CPS sub-layer and a Service Specific Convergence sub-layer (SSCS) of the AAL2 packet, Header Error Check (HEC) fields $206_1$, $206_2$, up to $206_n$ for identifying errored cells, Length Indicator (LI) fields $208_1$, $208_2$ up to $208_n$ for identifying the length of the packet payload 212 associated with each individual user and Channel Identifier (CID) fields $210_1$, $210_2$ up to $210_n$ for identifying the individual channels within the AAL2 packet.

Figure 3:
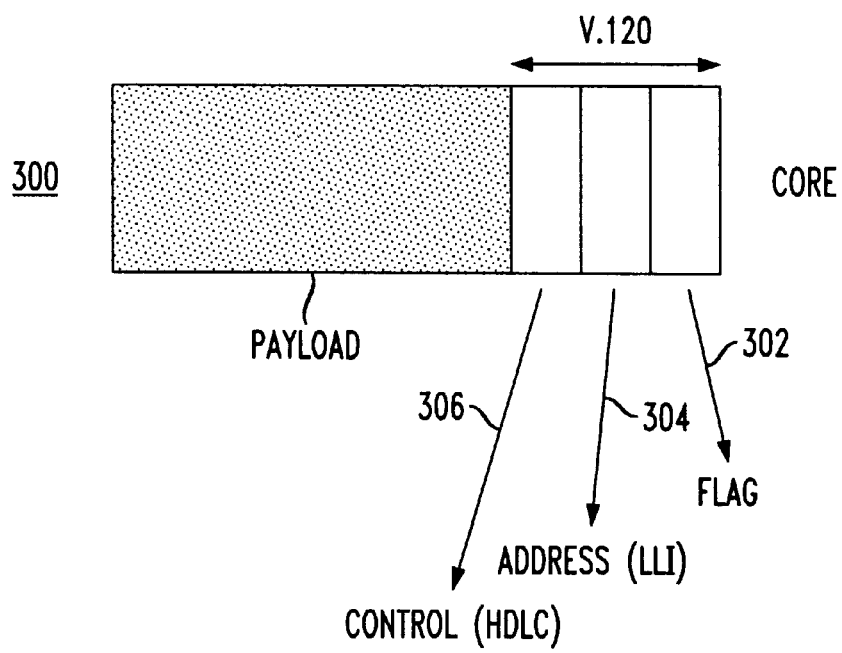
FIG. 3 depicts a diagram of a transport packet data structure useful in understanding the operation of the communications system in FIG. 1.

The above described packet structure may be transported as payload within a transport data packet structure as depicted in FIG. 3. Specifically, FIG. 3 depicts the data structure of a V.120 packet 300 that may be used in the communications system of FIG. 1 and is useful in understanding how an AAL2 payload 212 is encapsulated in a V.120 packet 300. The V.120 packet data structure is more thoroughly described in International Telecommunication Union—Telecommunication Standardization Sector (ITU-T) V.120, which is hereby incorporated by reference in its entirety.

A V.120 packet 300 comprises four fields including a flag field 302, an address field 304, a control field 306 and a payload field 308 containing an AAL2 payload 212. Within the context of the present invention, the V.120 packet data structure may be used to transport the AAL2 data structure depicted in FIG. 2 within a telecommunication network requiring V.120 compliance. The use of FIG. 3 is described more fully in a discussion of FIG. 4.

Figure 4:
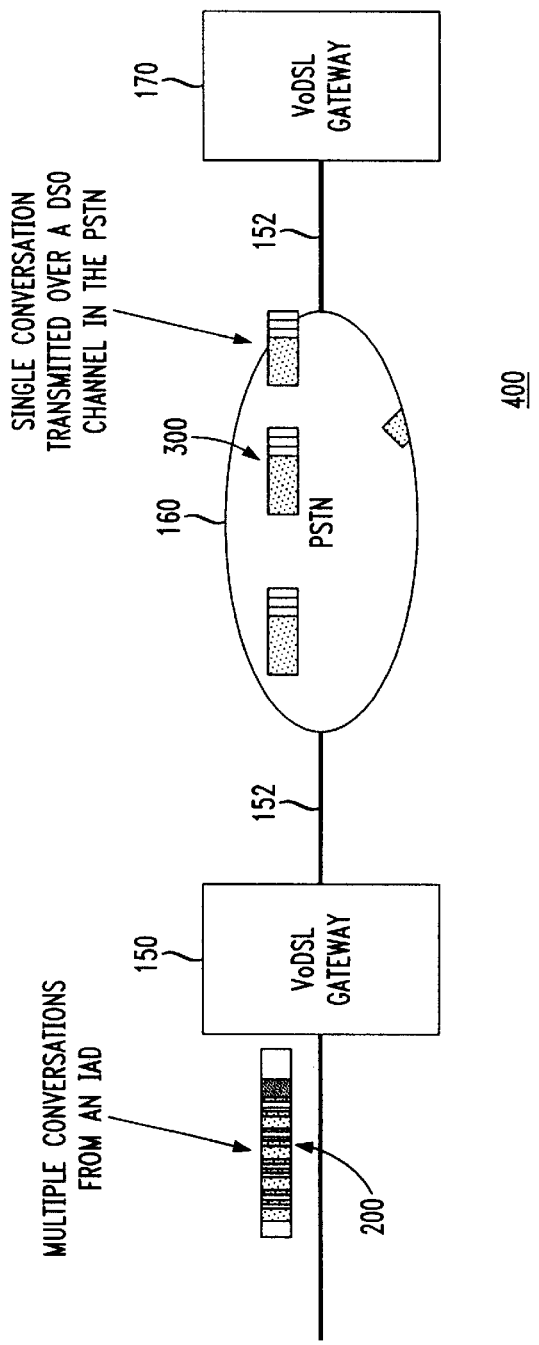
FIG. 4 depicts a graphical representation of the transmission of a V. 120 packet over the Public Switch Telephone Network (PSTN)

FIG. 4 depicts a graphical representation of the transmission of a V.120 packet 300 over the PSTN 160. More specifically, FIG. 4 shows the process in which a plurality of compressed voice conversations are each encapsulated in a V.120 packet 300 and transmitted over individual DS0 channels on a trunk over the PSTN 160.

Referring to FIG. 4, at the first VoDSL gateway 150, an arriving AAL2 packet payload 212 is extracted. Each payload 212 is placed in a V.120 payload 308. This V.120 packet is communicated over the PSTN on at least one Logical Link (LL) dedicated to carrying voice traffic between the first VoDSL gateway 150 and the second VoDSL gateway 170. For illustrative purposes, a Logical Link Identifier (LLI) of 20 will be assigned to carry voice traffic between the first VoDSL gateway 150 and the second VoDSL gateway 170.

At the second VoDSL gateway 170, the V.120 payload 308 is extracted and placed back into an AAL2 payload 212. In this manner, the AAL2 packets are routed over the PSTN 160 as packets rather than being converted from packets to PCM signals. Hence no degradation in converting from packet to PCM and again from PCM to packet at the gateways.

The AAL2 packet is routed over a second carrier 180 having ATM (ATM$_B$) service to a second DSLAM 190. The second DSLAM transmits the AAL2 packet on a DSL (DSL$_B$) service utilizing a second copper pair 200 where it reaches the second IAD 210 and is depacketized, uncompressed and converted to an analog voice signal. It should be noted, that although FIG. 4 depicts the transmission of the V.120 packet occurring in one direction, it occurs in both directions.

Figure 5:
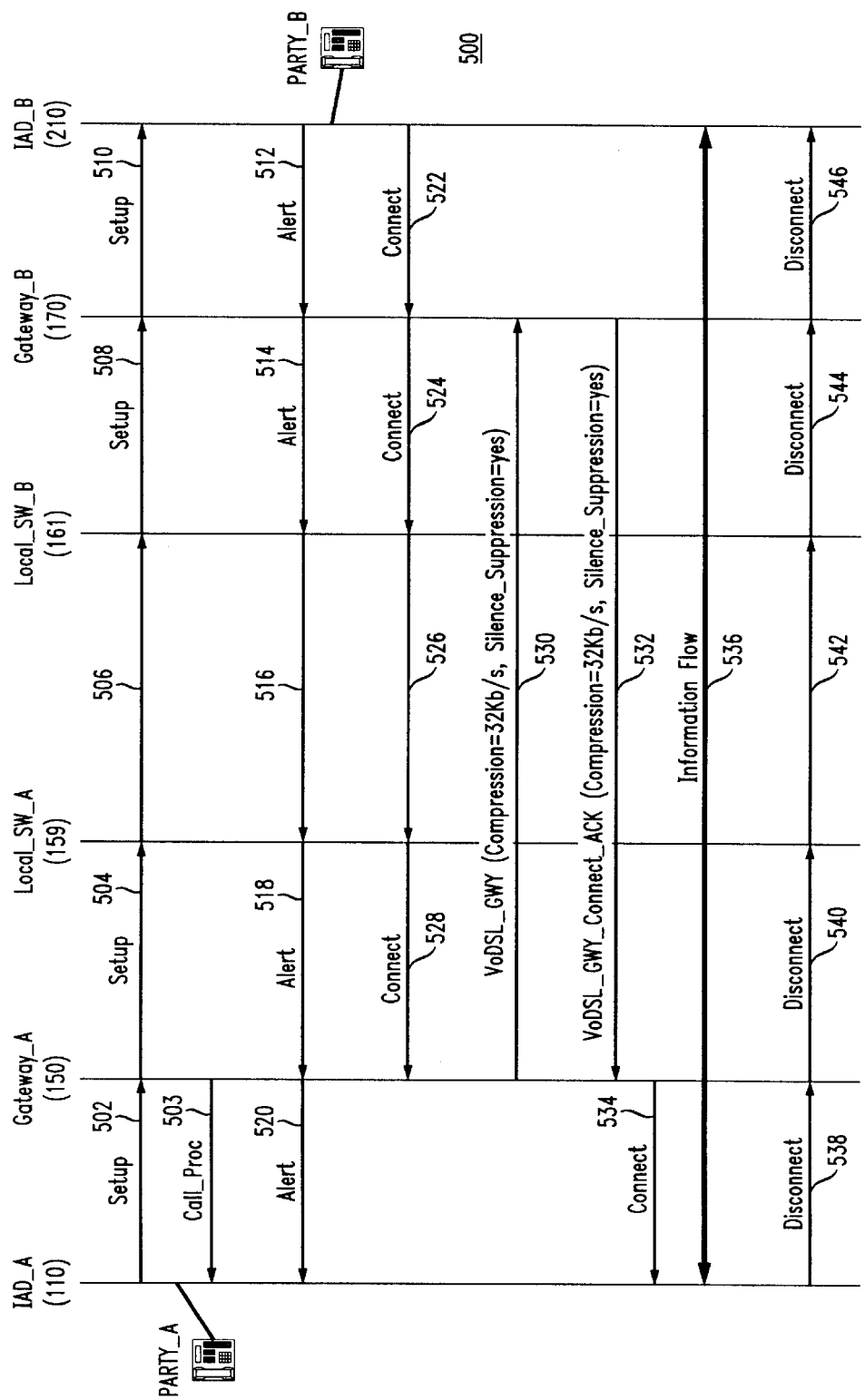
FIG. 5 depicts a call flow diagram useful in understanding an embodiment of the present invention.

FIG. 5 depicts a call flow diagram useful in understanding an embodiment of the present invention. Party A initiates a telephone voice call by picking up the telephone 112 and dialing party B's phone number. At step 502, the first LAD 110 communicates a Setup message to the first VoDSL gateway 150 indicating party B's telephone number, the voice compression rate, and whether silence suppression is being used.

At step 504, after receiving the Setup message, the first VoDSL gateway 150 determines the called party's telephone number (i.e., party B's telephone number), the voice compression rate and whether silence suppression is being used. The first VoDSL gateway 150 interfaces with the first switch 159 using, for example, the known GR303 or TR008 communication interfaces to communicate party B's telephone number to first switch 159.

At step 503, if the first VoDSL gateway 150 can communicate with first switch 159, the first VoDSL gateway 150 communicates a Call_Proc message to the first IAD 110 indicating that the first VoDSL gateway 150 is able to process the call with first switch 159. At step 506, first switch 159 examines the called party's telephone number to determine the local switch that serves party B. A determination is made that second switch 161 serves party B, and a call is established with second switch 161.

At step 508, second switch 161 determines that the Setup message needs to be routed through the second VoDSL gateway 170. The second VoDSL gateway 170 communicates the Setup message to the second IAD 210 in step 510. The setup message is interpreted by the second IAD 210, which responsively causes party B's telephone to ring.

In response to a ringing signal being communicated to party B by the second IAD 210, the second IAD 210 communicates an Alert message to the second VoDSL gateway 170 at step 512. The second VoDSL gateway 170, in turn, communicates the Alert message to second switch 161 at step 514. After receiving an Alert message from the second VoDSL gateway 170, second switch 161 communicates the Alert message to first switch 159 at step 516. At step 518, the first switch 159 communicates the Alert message to the first VoDSL gateway 150 which, in turn, communicates the Alert message to the first IAD 110 at step 520.

When party B goes "off hook", the second IAD 210 communicates a Connect message to the second VoDSL gateway 170 in step 522 indicating that party B is off hook and that a connection is established. The second VoDSL gateway 170 communicates the Connect message to second switch 161 in step 524. Second switch 161 communicates the Connect message to first switch 159 at step 526. At step 528, first switch 159 communicates the Connect message to the first VoDSL gateway 150.

At step 530, after receiving a Connect message, the first VoDSL gateway 150 encapsulates a VoDSL_GWY_Connect message with a V.120 frame and communicates it to the second VoDSL gateway 170 on a logical link dedicated to carrying signaling messages between the gateways. For illustrative purposes, it is assumed a logical link identifier of 10 has been assigned to carry signaling messages between the gateways. The VoDSL_GWY_Connect message contains parameters such as a call reference, party A's telephone number, party B's telephone number, a voice compression rate indicator, and a silence suppression indicator.

The first VoDSL gateway 150 expects to receive a response to the VoDSL_GWY_Connect message within a specific time interval. If there is no response to the VoDSL_GWY_Connect message within a specified time interval, the first VoDSL gateway 150 will assume there is no VoDSL gateway at the other end and will place a call using the conventional method of Pulse Code Modulation (PCM).

When the second VoDSL gateway 170 receives the VoDSL_GWY_Connect message, the second VoDSL gateway 170 determines, based on parameters contained in the message, whether a call can be established without making changes to the calling parameters. If the second VoDSL gateway 170 can not make the modification (for example the second VoDSL gateway 170 uses a different voice compression algorithm and can not do a conversion), then second VoDSL gateway 170 will communicate a VoDSL_Gateway_NACK message to the first VoDSL gateway 150. The VoDSL_Gateway_NACK message only contains a call reference Information Element (IE). Upon receiving the VoDSL_Gateway_NACK message, the first VoDSL gateway 150 will then implement the call using PCM.

At step 532, it is established that there is compatibility between the first VoDSL gateway 150 and the second VoDSL gateway 170. The second VoDSL gateway 170 communicates a VoDSL_GWY_Connect_NACK message containing a call reference IE to the first VoDSL gateway 150. The second VoDSL gateway has acknowledged the receipt of the first VoDSL gateway's 150 VoDSL_GWY message and can establish a call with party B.

At step 534, the first VoDSL gateway 150 communicates a Connect message to the first IAD 110. This indicates that continuity has been established with party B over a DS0 channel. At step 536, an information flow is established between party A and Party B using the process described in FIG. 4.

When a party hangs up, a Disconnect message is communicated and the connection is broken for the communication link. At step 538, the first IAD 110 communicates a Disconnect message to the first VoDSL gateway 150 and disconnects the call between the first IAD 110 and the first VoDSL gateway 150. At step 540, the first VoDSL gateway 150 communicates a Disconnect message to the first switch 159 disconnecting the call between the first VoDSL gateway 150 and the first switch 159.

The first switch 159 communicates the Disconnect message to the second switch 161 disconnecting the call between first switch 159 and second switch 161 at step 542. At step 544, the second switch 161 communicates a Disconnect message to the second VoDSL gateway 170 breaking the call. Finally, the second VoDSL gateway 170 communicates the Disconnect message to the second IAD 210 disconnecting the call between party A and party B.

The above-described invention advantageously provides a means of communicating voice traffic between VoDSL gateways in packetized form. Moreover, the invention advantageously does not require a conversion of the voice traffic from a packet format to a PCM format between gateways. In this manner, the invention provides a substantial improvement over prior art VoDSL gateway-to-gateway communication; thereby providing an improved voice quality signal.

The invention advantageously provides enhanced Quality of Service (QoS) by opportunistically avoiding signal degradation where VoDSL to VoDSL gateway communications may be provided.

Figure 6:
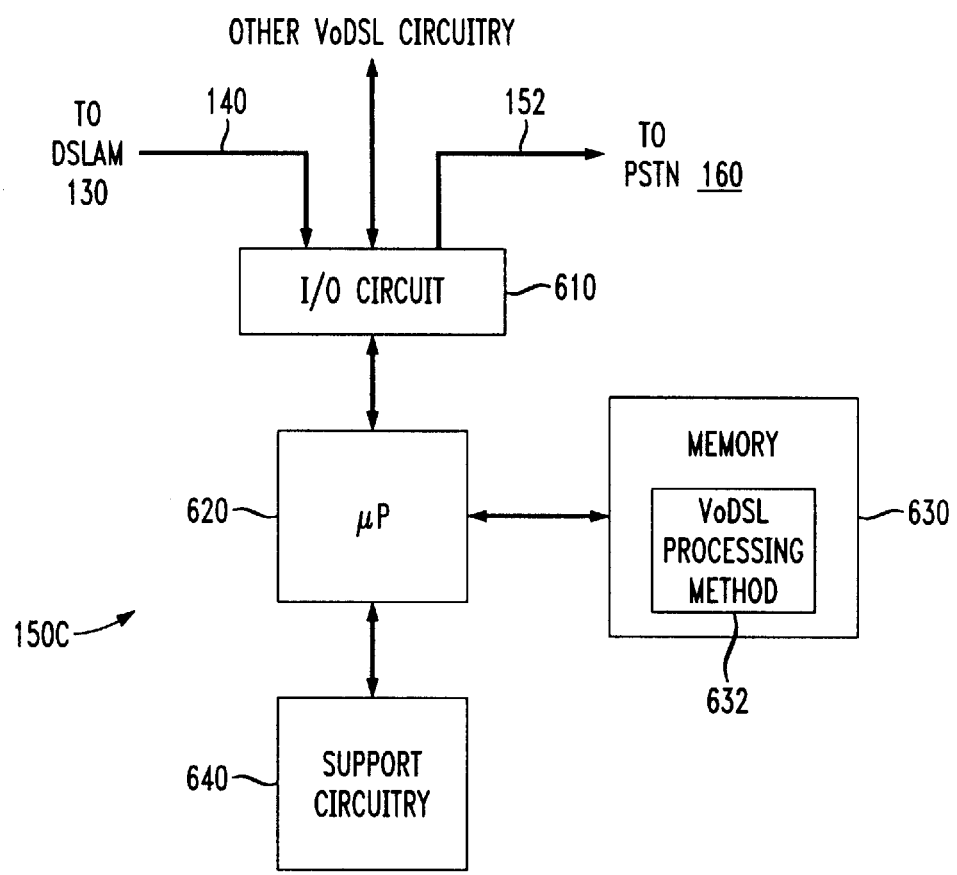
FIG. 6 depicts a high level block diagram of an embodiment of a controller suitable for use within a Voice over Digital Subscriber Line (VoDSL) gateway.

FIG. 6 depicts a high level block diagram of an embodiment of the optional controller 150C suitable for use within a Voice over Digital Subscriber Line (VoDSL) gateway. Specifically, FIG. 6 depicts a high level block diagram of a VoDSL gateway controller 150C suitable for use in VoDSL gateway 150 of the communication system 100 of FIG. 1. The VoDSL gateway controller 150C comprises a microprocessor 620 as well as memory 630 for storing a VoDSL processing method 632. The microprocessor 620 cooperates with conventional support circuitry 640 such as power supplies, clock circuits, cache memory and the like as well as circuits that assist in executing the software methods of the present invention. As such, it is contemplated that some of the process steps discussed herein as software processes may be implemented with hardware, for example, as circuitry that cooperates with the microprocessor 620 to form various steps.

The VoDSL gateway controller 150 also comprises input/output circuitry 610 that forms an interface between the microprocessor 620, the DSLAM 130, the PSTN 160 and other VoDSL circuitry (not shown).

Although the VoDSL controller 150C is depicted as a general purpose computer that is programmed to perform VoDSL control and processing functions in accordance with the present invention, the invention can be implemented in hardware, in software, or a combination of hardware and software. As such, the processing steps described above with respect to the various figures are intended to be broadly interpreted as being equivalently performed by software, hardware, or a combination thereof. It will be appreciated by those skilled in the art that the VoDSL controller 150C provides sufficient computing functionality to implement the invention as described above.

Although various embodiments which incorporate the teachings of the present invention have been shown and described in detail herein, those skilled in the art can readily devise many other varied embodiments that still incorporate these teachings.

What is claimed is:

1. A method of transporting voice traffic from a Voice over Digital Subscriber Line (VoDSL) gateway, over a Public Switched Telephone Network (PSTN), to a destination, said method comprising:
   receiving compressed voice traffic at said VoDSL gateway;
   determining whether said destination is serviced by a second VoDSL gateway by communicating a signaling message on at least one of a plurality of logical links dedicated to carrying signaling messages between said VoDSL gateway and said second VoDSL gateway via a Digital Signal level Zero (DS0) channel, wherein in response to a connect message said first VoDSL gateway communicates a VoDSL GWY message encapsulated in a V.120 packet to said second VoDSL gateway, and wherein said VoDSL GWY message comprises a call reference, a calling party telephone number, a called party telephone number, and a voice compression rate indicator; and
   transporting said compressed voice traffic to said second VoDSL gateway utilizing a plurality of transport packets, responsive to an affirmative determination that said destination is serviced by said second VoDSL gateway.

2. The method of claim 1, wherein said compressed voice traffic is received within the payload portions of Asynchronous Transfer Mode Adaptation Layer 2 (AAL2) packets.

3. The method of claim 2, further comprising the steps of:
   extracting the respective payload portions of said AAL2 packets at said first VoDSL gateway; and
   encapsulating the extracted payload portions of said AAL2 packets in a transport packet at said first VoDSL gateway.

4. The method of claim 3, wherein said transport packet is a V.120 packet.

5. The method of claim 1, wherein:
   in the case of a failure to detect a second VoDSL gateway serving said second subscriber, said voice traffic is encoded and transmitted to said second subscriber using a GR-303 interface.

6. The method of claim 1, wherein:
   in the case of a failure to detect a second VoDSL gateway serving said second subscriber, said voice traffic is encoded and transmitted to said second subscriber using a TR-008 interface.

7. The method of claim 1, wherein said determining step further comprises the step of:
   communicating voice traffic on at least one of said plurality of logical links dedicated to carrying voice traffic between said VoDSL gateway and said second VoDSL gateway via said DS0 channel.

8. The method of claim 1, further comprising the step of waiting for a VoDSL GWY message response from said second VoDSL gateway for a predetermined time.

9. The method of claim 8, further comprising the step of placing a call using the conventional method when there is no response to said VoDSL__GWY message within said predetermined time.

10. The method of claim 1, wherein in response to said VoDSL__GWY message said second VoDSL gateway communicates a VoDSL__GWY Connect__ACK message encapsulated in said V.120 packet to said first VoDSL gateway indicative of compatibility between said VoDSL gateway and said second VoDSL gateway.

11. The method of claim 10, wherein said VoDSL__GWY__Connect__ACK message comprises a call reference information element, a silence suppression indicator and a voice compression rate indicator.

12. The method of claim 10, further comprising the step of:
   communicating voice in V.120 packets over at least one of said plurality of logical links dedicated to carrying voice traffic between said VoDSL gateway and said second. VoDSL gateway.

13. In a communication system, apparatus comprising:
   a first VoDSL gateway, for communicating voice traffic between a first subscriber and a second subscriber via a Public Switch Telephone Network (PSTN);
   said first VoDSL gateway, in response to a second VoDSL gateway communicating a signaling message via said PSTN, transmits said voice traffic within a plurality of transport packets to said second VoDSL gateway, said signaling message being carried over at least one of a plurality of logical links dedicated to carrying signaling messages between gateways via a Digital Signal level Zero (DS0) channel, said signaling messages comprising:
      a connect message from said second VoDSL gateway to said first VoDSL gateway, and in response to said connect message, a VoDSL GWY message from said first VoDSL gateway to said second VoDSL gateway, wherein said VoDSL GWY message comprises a call reference, a calling party telephone number, a called party telephone number, and a voice compression rate indicator; and said first VoDSL gateway, in response to a failure to detect a second VoDSL gateway, encoding and transmitting said voice traffic to second subscriber in a conventional manner.

14. The apparatus of claim 13, wherein said transport packets comprise Asynchronous Transfer Mode Adaptation Layer 2 (AAL2) packets.

15. The apparatus of claim 14, wherein said AAL2 packets are included within V.120 packets.

16. The apparatus of claim 13, wherein said voice traffic is carried over at least one of a plurality of logical links dedicated to carrying voice traffic between gateways via a DS0 channel.

17. The apparatus of claim 13, wherein said first VoDSL gateway requires a response to said VoDSL GWY message from said second VoDSL gateway within a predetermined time to determine that said second VoDSL gateway is detected.

18. The apparatus of claim 17, wherein said second VoDSL gateway communicates a VoDSL_GWY_Connect_ACK message encapsulated in a V.120 packet to said first VoDSL gateway.

19. The communication system of claim 18, wherein said VoDSL_GWY_Connect_ACK message comprises a call reference element, a silence suppression indicator and a voice compression indicator.

20. The communication system of claim 18, wherein said voice traffic is communicated between said first VoDSL gateway and said second VoDSL gateway.

* * * * *